United States Patent [19]

Darby

[11] 4,163,283
[45] Jul. 31, 1979

[54] AUTOMATIC METHOD TO IDENTIFY AIRCRAFT TYPES

[76] Inventor: Ronald A. Darby, 256 Kuulei Rd., Kailua, Hi. 96734

[21] Appl. No.: 786,560

[22] Filed: Apr. 11, 1977

[51] Int. Cl.² .............................................. G01B 7/04
[52] U.S. Cl. ................................ 364/439; 235/92 TC; 364/424
[58] Field of Search ........... 235/150.24, 150.2, 151.32, 235/151.3, 92 EV, 92 TC; 246/2 S, 122 R, 167 D, 247; 340/386 R, 146.3 K; 364/424, 436, 439, 565; 104/26 B

[56] References Cited

U.S. PATENT DOCUMENTS

| | | | |
|---|---|---|---|
| 3,324,301 | 6/1967 | Goldberg | 246/2 S |
| 3,406,395 | 10/1968 | Zupanick | 364/565 |
| 3,436,656 | 4/1969 | Brand, Jr. | 364/565 |
| 3,504,173 | 3/1970 | Brinker | 246/122 R |
| 3,573,441 | 4/1971 | Glazar | 235/150.24 |
| 3,731,067 | 5/1973 | Arevian et al. | 340/38 R |
| 3,796,864 | 3/1974 | Sampey | 246/167 D |
| 4,023,017 | 5/1977 | Ceseri | 235/150.24 |

*Primary Examiner*—Errol A. Krass
*Attorney, Agent, or Firm*—James C. Wray

[57] ABSTRACT

Two sensors spaced at a known separation produce signal pulses when activated by the wheels of a taxiing aircraft. The signals are transmitted to a processor in which the wheelbase of the aircraft can readily be calculated. Since specific aircraft types have unique wheelbase dimensions and characteristics, the type of aircraft passing the sensors is determined in a processor. Also, the time, direction, and speed of the aircraft can be determined and logged by the processor.

25 Claims, 3 Drawing Figures

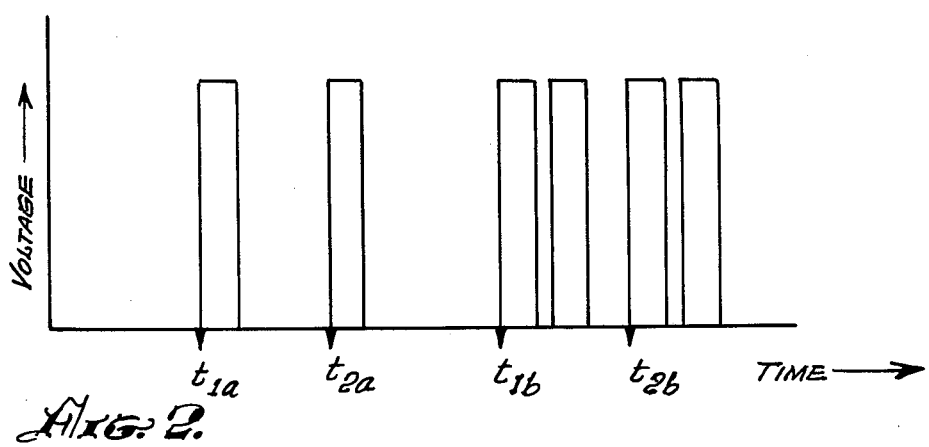
FIG. 2.
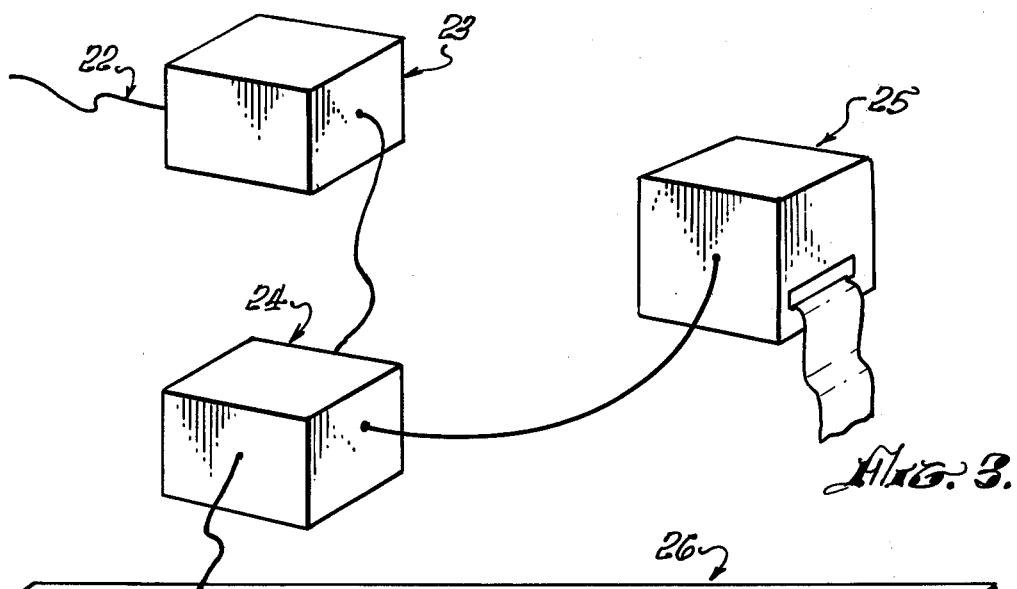
FIG. 3.
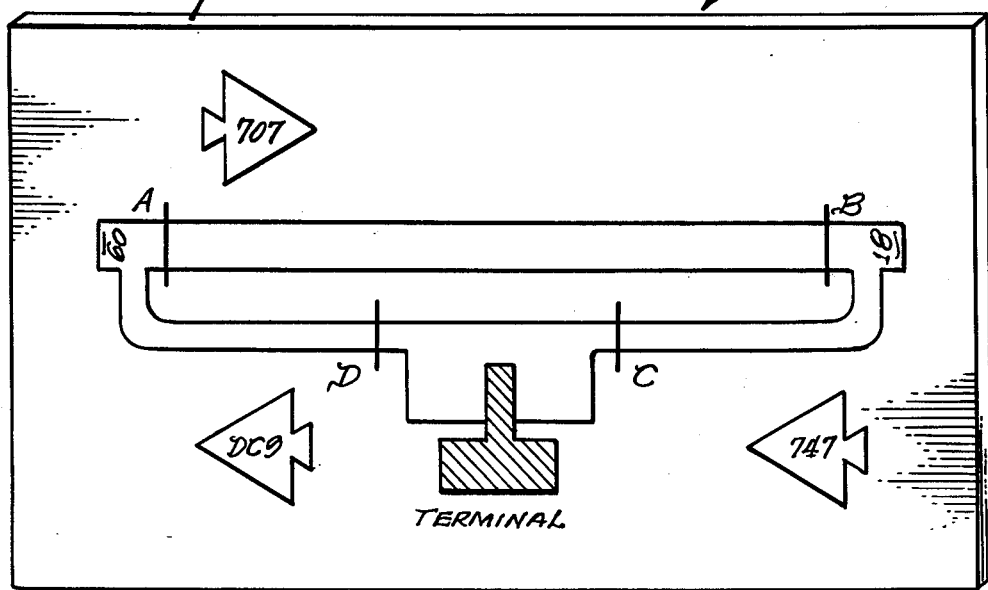

AUTOMATIC METHOD TO IDENTIFY AIRCRAFT TYPES

BACKGROUND OF THE INVENTION

A basic problem exists in obtaining accurate statistics of aircraft types using specific runways at airports. Such information is used for optimizing runway utilization and to make projections for future plans. Presently, this type of information is obtained by human observers manually noting the aircraft types using runways for arrivals or departures and to determine the taxi-and-hold times between two given locations for various aircraft types.

There is also need to assist ground controllers at airports when there is heavy traffic or poor visibility in tracking the location of aircraft and in knowing the types of aircraft involved with a minimum of communication between the control tower and aircraft.

At airports with aircraft noise monitoring systems there is a need to automatically classify the type of aircraft causing excessive noise after take-off or before landing. Such aircraft type identification is presently accomplished by observers or by reconstruction using the play-back of recordings of radio communications between the control tower and aircraft.

Automatic aircraft noise monitoring systems also require more reliable means to detect the aircraft traffic pattern at the airport in order to optimize system tracking and noise classification parameters. Presently automatic traffic pattern detection is accomplished by wind velocity sensors and acoustic sensors which are often unreliable in light fluky winds or due to false noise events respectively.

SUMMARY OF THE INVENTION

The present invention provides a method to automatically classify the type of aircraft as well as its speed and direction while passing a sensor set at a given location on a runway or taxiway. By judiciously locating the sensor sets and by recording the time of the aircraft passing as well as the location, reliable data for the following may be automatically obtained with respect to aircraft type: (1) runway and taxiway usage statistics, (2) taxi-and-hold times between two locations, (3) the location of aircraft in specified sectors of runways or taxiways, (4) the classification of aircraft type causing noise exceedance, and (5) the determination of the aircraft pattern (direction of runway usage).

The method comprises the following components: a sensor set with its output signal conditioning device, a data transmission link to the input signal conditioning device for the processor, the processor with its input signal conditioning device, and a data read-out device.

The sensor set comprises two sensors spaced with a known separation along a runway or taxiway which produce signals when activated by the presence of the individual wheels of a passing aircraft. The time intervals between the transient signals caused by the individual wheels of the aircraft activating the two sensors systems are utilized by the processor to calculate the aircraft wheelbase, that is, the distance between the main landing gear and either the nose or tail wheels. The same time intervals are used to determine the speed and direction of the aircraft. The processor contains a look-up table relating aircraft types to the calculated aircraft wheelbase and the number of wheels in the main landing gear assembly if necessary. The processor also stores data from each aircraft passing event; e.g. the aircraft type with the time of the event, the direction of travel, and location of the event; allowing long-term statistics of runway or taxiway usage to be accumulated; the development and accumulation of taxi-and-hold times; the localization of aircraft in given sectors of the airport; and the post facto identification of the aircraft type causing excessive noise in the airport environs. The data read-out device is actuated by the processor as required for the statistical data, excessive noise events, or the real time display of aircraft types localized in airport sectors.

BRIEF DESCRIPTION OF THE DRAWING

In the drawing:

FIG. 2 is the resulting sequence of signal pulses generated by the sensors as the aircraft passes by the sensor set;

FIG. 3 is an isometric of the remaining components of the invention located in an airport facility where the data is utilized.

DESCRIPTION OF THE PREFERRED EMBODIMENTS

Figure 1:
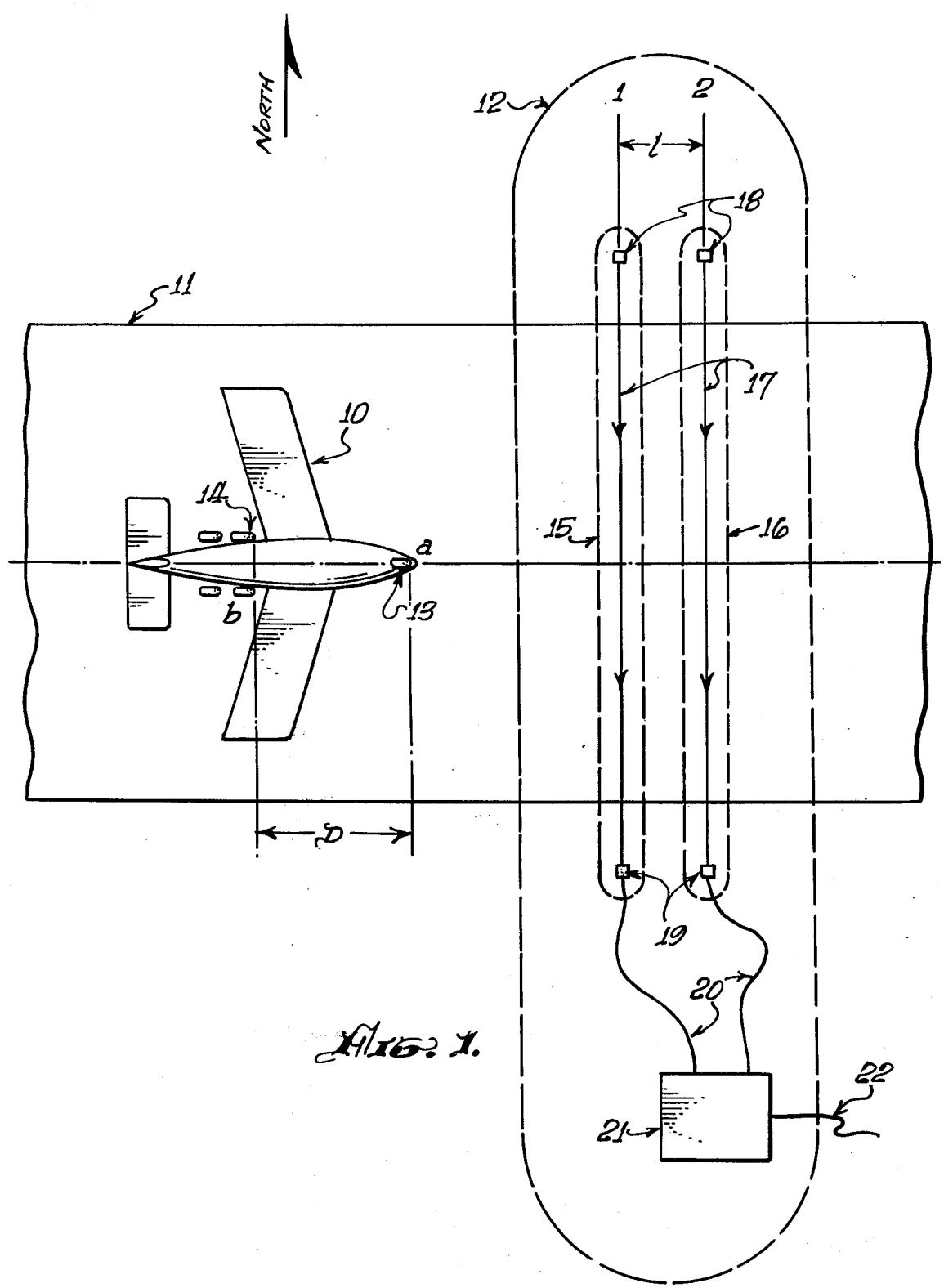
FIG. 1 is a plan view of a sensor set on a runway or taxiway with an aircraft approaching the sensor set.

FIG. 1 illustrates an aircraft 10 taxiing at speed V on a runway 11 approaching a sensor set 12. The nominal wheelbase of the aircraft 10 is the distance D between the nose wheel 13 at location a on the aircraft and the front wheel 14 at location b of the main landing gear. The sensor set 12 comprises two sensor systems 15 and 16 shown at locations 1 and 2 respectively with a separation of distance $\iota$ along the runway 11. Each sensor system 15 and 16 could be comprised of light beams 17 emanating from light sources 18 and being received by photocell units 19. When the wheels of the aircraft 10 break the light beams 17, electric signals are transmitted from the photocell units 19 via cables 20 to the output signal conditioning device 21 which, in turn, transmits signals over the data transmission link 22.

FIG. 2 illustrates the sequence of signal pulses generated at output cables 20 in sensor set 12 as the aircraft 10 passes by the sensor set 12. The time t of occurrence of the pulses are characterized by the first subscript designating the sensor set involved and the second subscript the wheel of the aircraft involved. For example, the pulse at time 1a is caused by sensor system 15 at location 1 on the runway 11 being actuated by the nose wheel 13 at location a on the aircraft 10.

The speed of the aircraft can be calculated utilizing the measured time interval, e.g. $(t_{2a}-t_{1a})$, between the pulses from the sensor systems caused by actuation from a given wheel at a single location on the aircraft, e.g. location a:

$$V = \iota/(t_{2a}-t_{1a}).$$

The nominal wheelbase dimension D can then be calculated by utilizing the measured time interval, e.g. $(t_{1b}-t_{1a})$, between the pulses from a given sensor system location, e.g. location 1, caused by actuation of the wheels at the two different locations on the aircraft, e.g. locations a and b:

$$D = V(t_{1b}-t_{1a}).$$

Using these two relationships the nominal wheelbase D can be expressed as the product of the known distance $l$ and the ratio of the two measured time intervals:

$$D = l \frac{(t_{1b} - t_{1a})}{(t_{2a} - t_{1a})}.$$

To account for the aircraft taxiing at other than constant velocity V as it passes by the sensor set, the other combination of pulse time intervals can be used to improve the accuracy and to obtain the average velocity or the average calculated wheelbase $\bar{D}$:

$$(\bar{D} = D + D')/2$$

where $$D' = l \frac{(t_{2b} - t_{2a})}{(t_{2b} - t_{1b})}.$$

Since the nominal orientation of the runway is known, the direction of travel of the aircraft can be expressed in degrees, e.g. 90°, if the first pulse arrives from sensor system 15 and can be expressed in the supplement direction, e.g. 270°, if the first pulse arrives from sensor system 16.

The raw signal pulses from the sensor systems 15 and 16 as shown in FIG. 2 may be sent over the data transmission link 22 or preprocessing may be accomplished in the signal conditioning device 21 to transmit data in the form of time intervals or ratios of time intervals. In either case, the data is transmitted to the input signal conditioning device 23 in the vicinity of the processor 24 as illustrated in FIG. 3. If raw signal pulses are transmitted, then all processing of the calculations is accomplished in the processor 24 illustrated in FIG. 3. The processor obtains the following typical information: the measured and calculated wheelbase $\bar{D}$ resulting from the aircraft passing the sensor set at location A at time $t_{1a}$ in direction X°.

The processor contains a look-up table of wheelbase dimensions and the characteristics of the landing gear for various aircraft types and identifies the wheelbase bin (or range of values) into which the calculated wheelbase value D belongs. Following is a typical table of wheelbase bins for common commercial jet aircraft:

| Aircraft Type | Wheelbase D in feet | | | | | | | | | | | | | | | | | |
|---|---|---|---|---|---|---|---|---|---|---|---|---|---|---|---|---|---|---|
| | 39 | 41 | 43 | 45 | 47 | 49 | 51 | 53 | 55 | 57 | 59 | 61 | 63 | 65 | 67 | 69 | 71 | 73 |
| 737-Mod 200 | X | | | | | | | | | | | | | | | | | |
| DC-9 Mod 20 | | | X | | | | | | | | | | | | | | | |
| DC-9-Mod 40 | | | | | | | X | | | | | | | | | | | |
| 707-Mod 320 | | | | | | | | | | X | | | | | | | | |
| DC-10 | | | | | | | | | | | | | | | X | | | |
| 727-Mod 200 | | | | | | | | | | | | | X | | | | | |

The processor 24 actuates a read-out device which may be in the form of a printer 25 or a real-time display board 26. If desired, the printer could document each aircraft movement event at all sensor set locations, e.g.:

| Location | Aircraft Type | Time | Direction | Speed |
|---|---|---|---|---|
| A | 707-B | 1803:15 | 90° | 20 mph |
| B | 747 | 1803:18 | 270° | 20 mph |

-continued

| Location | Aircraft Type | Time | Direction | Speed |
|---|---|---|---|---|
| D | DC-9 | 1804:00 | 270° | 15 mph |

The processor 24 could contain a memory bank and obtain long term statistics on runway and taxiway usage by aircraft types, e.g.:

| Takeoffs from Runway 09 for Month of March 1977 | | |
|---|---|---|
| Aircraft Type | Peak Hours | Off Peak Hours |
| 747 | 130 | 70 |
| 707 | 110 | 62 |
| DC-9 | 140 | 83 |

Similarly the processor 24 could accumulate taxi-and-hold times between two sensor set locations, e.g.:

| Average Taxi-and-Hold Times Between D and A in Minutes | | |
|---|---|---|
| Aircraft Type | Peak Hours | Off Peak Hours |
| 747 | 8 | 2 |
| 707 | 10 | 3 |
| DC-9 | 7 | 5 |

The processor could be integrated with an automated noise monitoring system and when excessive aircraft noise is measured in the airport environs by the noise monitoring system, typical print-outs are:

| Aircraft Type | Departure Time A | Decibels at Microphone Location | | | |
|---|---|---|---|---|---|
| | | 1 | 2 | 3 | 4 |
| 707 | 19:08 | 105 | 98 | 87 | 67 |
| 747 | 20:13 | 92 | 88 | 71 | 60 |

Statistics showing which aircraft types cause excessive noise levels above given noise thresholds can be automatically developed, e.g.:

| | Noise Exceedances at Microphones 1 Through 4 During March 1977 | | |
|---|---|---|---|
| Aircraft Type | Day | Night | Total |
| 747 | 3 | 9 | 12 |
| 707 | 11 | 15 | 26 |
| DC-9 | 8 | 2 | 10 |

Typical options other than the optical system used above as the example for the sensor-systems are vibration sensors, inductance sensors, and magnetic sensors. The primary constraints on acceptable sensor types are: technical constraints, e.g. short signal pulse rise times, commonly in the region of 1 millisecond, in order to provide acceptable classification between aircraft types with similar landing gear characteristics; environmental constraints due to temperature, moisture, corrosion, and optical transparency; and aircraft operational constraints such as minimum intrusion into critical airspace, maximum resistance to injestion by jet engine intakes, and durability under jet exhaust blasts.

Typical options for the data transmission link 22 are common voice grade telephone lines with output and input signal conditioning devices 21 and 23 containing tone burst generators and receivers respectively or containing analog to digital conversion devices; or the data transmission link 22 may be via radio or optical transmission with signal conditioning devices 21 and 23 containing compatible transmitters and receivers respectively.

I claim:

1. A method to automatically classify the type of aircraft moving on the ground by automatically determining sufficient physical characteristics unique to the landing gear of each given type of aircraft, said characteristics being the nominal major wheelbase, the total number of axles, and the spacing of the main carriage axles, comprising the steps of: providing a system comprising a sensor set, a data transmission link, a processor, and a data read-out device; said sensor set comprising two sensor systems located at a known distance apart which are activated by the wheels of the aircraft and produce a sequence of signal pulses, said data transmission link to transmit the signal pulses to the processor, said processor to generate signals representative of the type of aircraft, the location of the sensor set, the time of an event, the direction of travel of the aircraft and the speed of the aircraft in response to time intervals between signal pulses, and wheelbase characteristics from a look-up table in the memory bank of said processor, and said data read-out device to indicate the type of aircraft, the location of the sensor set, time of an event, direction of travel of the aircraft, and the speed of the aircraft.

2. The method of claim 1 including the step of providing a plurality of sensor sets and data transmission links, said sensor sets being located on a plurality of runways and/or taxiways at an airport and said processor generating signals representative of accumulations of selected signals generated by the processor over a selected period of time related to aircraft type and runway and/or taxiway usage, and the taxi-and-hold times between sensor sets.

3. The method of claim 1 including the steps of providing a plurality of sensor sets and data transmission links and additional logic in the processor, making the processor for compatibility with a read-out device comprising a real time display board visually indicating the type of aircraft and direction of travel within various sectors of taxiways and runways.

4. The method of claim 1 including the step of interfacing the process with an automatic noise monitoring system such that the data read-out device indicates the type of aircraft associated with a noise exceedance in the airport environs after take-off or landing on runways implemented with said sensor sets.

5. The method of claim 1 including the step of interfacing the processor with an automatic aircraft noise monitoring system such that the data read-out device indicates the type of aircraft traffic pattern used at a given time and said processor can be interfaced with the the automatic noise system to optimize acoustic tracking of aircraft flights and to assist the noise monitoring system in discriminating aircraft noise events from non-aircraft noise events, such as caused by passes of motorcycles and trucks.

6. Apparatus for determining selected parameters related to aircraft type having characteristic landing gear comprising
first sensing means positioned adjacent a runway or taxiway travelled by the aircraft type for producing pulses upon detecting passage of wheels on the aircraft type past a first known position along the runway or taxiway,
second sensing means positioned adjacent said runway or taxiway and spaced from the first sensing means a known distance along the pathway for producing pulses upon detecting the passage of wheels on the aircraft type past a second known position along the pathway,
data transmission means connected to the first and second sensing means for communicating pulses produced by the first and second sensing means to processor means,
aircraft type processor means connected to the data transmission means for generating signals representative of selected parameters related to the aircraft type in response to time intervals between pulses produced by the sensing means,
data display means connected to the processor means for displaying data representative of the selected parameters related to the aircraft type in response to the signals generated by the processor means.

7. The apparatus of claim 6 wherein
the data display means comprises printer means for generating static characters representative of the selected parameters related to the aircraft type in response to the signals generated by the processor means.

8. The apparatus of claim 6 wherein
the data display means comprises real time display means for generating images representative of the selected parameters related to the aircraft type substantially simultaneously with the passage of the aircraft type along the runway or taxiway in response to the signals generated by the processor means.

9. The apparatus of claim 6 wherein the first and second sensor means comprise
light beam generating means positioned along one side of the runway or taxiway for directing beams of light transversely across the runway or taxiway, and
photocell means positioned along the other side of the pathway for receiving the beams of light generated by the light beam generating means,
wherein the data transmission means is connected to the photocell means for communicating pulses produced by the photocell means upon interruption of the beams of light to the processor means.

10. The apparatus of claim 6 wherein the processor means comprises
identification memory means for storing data correlating known aircraft type identifications with known characteristic wheelbases,
wheelbase calculator means connected to the data transmission means for generating signals representative of the wheelbase of the aircraft type in response to the pulses produced by the sensing means and
comparator means connected to the calculator means and identification memory means for comparing signals generated by the calculator means with the data stored in the identification memory means and generating signals representative of the aircraft type identification corresponding to the aircraft type travelling along the runway or taxiway.

11. The apparatus of claim 10 wherein the processor means further comprises
traffic memory means connected to the comparator means for accumulating and storing data representative of the aircraft type identification signals generated by the comparator means during a selected period of time.

12. The apparatus of claim 6 wherein
the processor means comprises signal conditions means connected to the data transmission means for generating signals representative of the time intervals between pulses produced by the sensing means in response to the pulses communicated by the data transmission means.

13. The apparatus of claim 12 wherein the processor means further comprises
time memory means connected to the signal conditioning means for accumulating and storing data representative of the time interval signals generated by the signal conditioning means during a selected period of time.

14. The apparatus of claim 6 wherein
the data transmission means comprise voice grade telephone lines connected to the first and second sensing means and the processor means.

15. The apparatus of claim 6 wherein the data transmission means comprise
electromagnetic signal transmitting means connected to the first and second sensing means for transmitting electromagnetic signals representative of pulses produced by the first and second sensing means in response to the pulses, and
electromagnetic signal receiving means connected to the processor means for receiving signals transmitted by the electromagnetic signal transmitting means and generating signals representative of the pulses produced by the first and second sensing means in response to the signals received from the electromagnetic signal transmitting means.

16. The apparatus of claim 6 wherein the processor means comprises
speed calculator means connected to the data transmission means for generating signals representative of the speed of the aircraft type in response to the pulses produced by the sensing means.

17. The apparatus of claim 6 wherein the processor means comprises
direction calculator means connected to the data transmission means for generating signals representative of the direction of the aircraft type in response to the pulses produced by the sensing means.

18. The apparatus of claim 6 further comprising noise level sensing means positioned in the vicinity of the airport containing the runway or taxiway for generating signals representative of the noise level produced by the aircraft over the noise level sensing means, and
noise level processor means connected to the noise level sensing means for generating signals representative of various noise exposure parameters, the noise level processor means connected to the aircraft type processor means and data display means for integrating the noise exposure parameter signals and the signals generated by the aircraft type processor means and generating signals representative of the integration of the signals of the type of aircraft generating the noise exposure parameters,
the data display means displaying data representative of the signals generated by the noise level processor and the aircraft type processor in response to said signals.

19. The apparatus of claim 18 wherein the noise processor means connected to the aircraft type processor means comprises
memory means for accumulating and storing data representative of the integrated signals generated by the noise level processor connected to the aircraft type processor during a selected period of time.

20. A method for classifying type of aircraft by determining landing gear characteristics comprising sensing the passage of wheels of the aircraft past a first known position along a runway or taxiway travelled by the aircraft, generating pulse signals in response to the sensed passage of the wheels past the first known position, sensing the passage of wheels of the aircraft past a second known position along the runway or taxiway, the second known position spaced from the first known position a known distance along the runway or taxiway, generating pulse signals in response to the sensed passage of the wheels past the second known position, measuring the time intervals between pulse signals, generating signals representative of selected parameters related to the aircraft in response to the measured time intervals, and displaying data representative of the selected parameters related to the aircraft in response to the signals representative of the selected parameters.

21. The method of claim 20 wherein the process of generating signals representative of selected parameters related to the aircraft comprises
storing data correlating known aircraft type identifications with known characteristic wheelbases,
generating wheelbase signals representative of the wheelbase of the aircraft in response to measured time intervals between signals generated by the wheels passing the first known position and signals generated by the wheels passing the second known position,
comparing the wheelbase signals with the stored data, and
generating signals representative of the aircraft identifications corresponding to the aircraft travelling along a runway or taxiway in response to the comparison.

22. The method of claim 21 further comprising
accumulating data representative of the aircraft identification signals during a selected period of time
storing the data representative of the aircraft identification signals.

23. The method of claims 20 wherein the process of generating signals representative of selected parameters related to the aircraft comprises
generating signals representative of the speed of the aircraft in response to measured time intervals between signals generated by the wheels passing the known positions.

24. The method of claims 20 wherein the process of generating signals representative of selected parameters related to the aircraft comprises
generating signals representative of the direction of the aircraft in response to the sequence of pulse signals generated by the wheels passing the first and second known positions.

25. The method of claim 20 further comprising sensing the noise produced by the aircraft before or after it traveled along the runway or taxiway, generating signals representative of the sensed noise levels, integrating the noise level signals and the signals representative of selected parameters related to the aircraft, generating signals representative of the integration of the signals thereby relating noise levels caused by the aircraft after departing from the runway or before landing on the runway with the type of aircraft.

* * * * *